United States Patent
McCormick et al.

(10) Patent No.: US 6,169,894 B1
(45) Date of Patent: Jan. 2, 2001

(54) APPARATUS, METHOD AND SYSTEM FOR MOBILE BROADCAST OF INFORMATION SPECIFIC TO A GEOGRAPHIC REGION

(75) Inventors: Mark Alan McCormick; Leslie Joseph Williams, both of Naperville, IL (US)

(73) Assignee: Lucent Technologies, Inc., Murray Hill, NJ (US)

(*) Notice: Under 35 U.S.C. 154(b), the term of this patent shall be extended for 0 days.

(21) Appl. No.: 09/200,333

(22) Filed: Nov. 25, 1998

(51) Int. Cl.$^7$ .................................. H04M 3/42
(52) U.S. Cl. ............... 455/414; 455/517; 455/185.1; 455/5.1; 340/905
(58) Field of Search ................................ 455/507, 509, 455/517, 518, 456, 436, 422, 414, 4.1, 4.2, 5.1, 166.1, 166.2, 185.1, 186.1, 188.1, 450, 458, 451, 452; 340/825.44, 905

(56) References Cited

U.S. PATENT DOCUMENTS

| | | | |
|---|---|---|---|
| 5,276,909 | * 1/1994 | Milner et al. | 455/38.5 |
| 5,303,401 | * 4/1994 | Duckeck et al. | 455/186.1 |
| 5,555,446 | * 9/1996 | Jasinski | 455/517 |
| 5,579,535 | * 11/1996 | Orlen et al. | 455/421 |
| 5,635,924 | * 6/1997 | Tran et al. | 340/905 |
| 5,636,245 | * 6/1997 | Ernst et al. | 375/259 |
| 6,018,649 | * 1/2000 | Ruhl | 455/186.1 |
| 6,049,711 | * 4/2000 | Ben-Yehezkel et al. | 455/414 |

* cited by examiner

Primary Examiner—Reinhard J. Eisenzopf
Assistant Examiner—Charles N. Appiah
(74) Attorney, Agent, or Firm—Nancy R. Gamburd (57) ABSTRACT

An apparatus, method and system provide or broadcast information within a given geographic region that is also specific to a given geographic region, such as traffic reports, sightseeing interests, public services information, or weather conditions. The apparatus, method and system of the present invention also provide for different or varying information to be broadcast from region to region; specific hand-off procedures as mobile units change regions; the capability for multiple mobile units to utilize the same broadcast channel containing the information; and the muting of the reverse voice channels of such mobile units during such broadcast sessions. The system of the present invention includes a plurality of serving transceivers located in a corresponding plurality of geographic areas, and a switching center coupled via a plurality of trunk lines to the plurality of serving transceivers. The system is user activated, wherein the switching center, when operative, includes program instructions to receive from a first serving transceiver a first request from a first mobile unit for an information broadcast feature in a first geographic area, and to connect a trunk line having the requested information broadcast feature to a broadcast channel; to direct the first serving transceiver to transmit a directive to the first mobile unit to the broadcast channel in the first geographic area and to mute a transmit voice channel of the first mobile unit.

31 Claims, 5 Drawing Sheets

APPARATUS, METHOD AND SYSTEM FOR MOBILE BROADCAST OF INFORMATION SPECIFIC TO A GEOGRAPHIC REGION

FIELD OF THE INVENTION

The present invention relates in general to telecommunication systems, and more particularly, to an apparatus, method and system for mobile or wireless broadcast of information specific to a geographic region or locality.

BACKGROUND OF THE INVENTION

Commuters and travelers often receive radio broadcasts for a large, metropolitan area. These broadcasts may contain information pertinent to such an entire metropolitan area, such as traffic reports during rush hour. These traffic reports, however, typically cover an entire metropolitan area, and are only available during specific broadcast intervals, such as every ten minutes. Such information is also typically very general, and may not specifically pertain or apply to the precise area in which the commuter or traveler is currently, at that moment in time.

A typical broadcast in the greater Chicago metropolitan area, for example, may include general traffic information for portions of freeways and highways in and out of downtown Chicago, along with information pertaining to traffic along highways in the suburbs and the greater tri-state area. Other geographic areas within the broadcast region of metropolitan Chicago, however, may not receive any information specifically pertinent to their geographic region. For example, a commuter in Gary, Indiana will typically receive Chicago traffic information, not traffic information relevant to the stretches of highway within the city of Gary.

In addition, such information is typically quite general, and does not include information for smaller geographic regions. For example, a commuter may want to know that traffic along a local main road is particularly slow, whereas this information is completely irrelevant to a commuter as little as a few miles away.

As a consequence, a need remains for an apparatus, method and system that may provide or broadcast information to a given geographic region, in which the information is also specific to that geographic region. Such information may include geographically specific information such as traffic reports, sightseeing interests, weather conditions, or any other information specific to the local geographic region. Such an apparatus, method and system should also provide different or varying information from region to region. In addition, such an apparatus, method and system should be user friendly, user transparent, cost effective, and capable of implementation in existing communication systems.

SUMMARY OF THE INVENTION

In accordance with the present invention, geographically specific information is broadcast over specific channels within a specific geographic region, such as within the broadcast region of a specific cellular transceiver. Such information will, in general, vary from region to region, and will vary over time. When accessed, such information is broadcast to mobile units, such as cellular telephones, which are within the given region at any given time. In accordance with the preferred embodiment, such access and broadcast are user initiated, by the user dialing a specific sequence or number designated by the service provider for this particular type of service.

The various embodiments of the present invention allow multiple mobile units to utilize the same broadcast channel having the geographically specific information in the given region. As a consequence, to avoid potential interference, in the preferred embodiments the reverse (transmit) voice channels of such mobile units are muted, and other multiparty features disabled, during such broadcast sessions.

Specific hand-off procedures are also provided, as a mobile unit may traverse multiple geographic regions and receive different and varied information during any particular broadcast session. In addition, depending upon whether a given geographic region provides such a broadcast, a hand-off procedure may not occur, with the broadcast channel retained by the current transmitter.

The preferred system for mobile broadcast of information specific to a geographic region includes, first, a plurality of serving sites located in a corresponding plurality of geographic areas, the plurality of serving sites having a first serving site, with a switching center coupled via a plurality of trunk lines to the plurality of serving sites. The switching center, when operative, includes program instructions to receive from the first serving site a first request from a first mobile unit for an information broadcast feature in a first geographic area served by the first serving site, such as the reception of a designated feature code entered by a user. The switching center then determine whether a broadcast channel providing the information broadcast feature is currently in use in the first geographic area; and when the broadcast channel is not currently in use in the first geographic area, the switching center connects a trunk line having the requested information broadcast feature to the broadcast channel and directs the first serving site to provide power to a transmitter in the first serving site. The switching center includes further instructions to direct the first serving site to transmit a directive to the first mobile unit to a frequency of the broadcast channel in the first geographic area, and to mute a transmit voice channel of the first mobile unit.

The switching center includes further instructions to monitor whether any mobile unit of a plurality of mobile units is receiving the broadcast channel in the first geographic area, such as by keeping a count of receiving mobile units, and when there are no mobile units of the plurality of mobile units receiving the broadcast channel in the first geographic area, to direct the first serving site to remove power to the transmitter of the broadcast channel in the first serving site.

For a potential hand-off, the switching center also includes further instructions to monitor the SAT signal strength of the first mobile unit. When the SAT signal strength of the first mobile unit received by the first serving site is below a predetermined level, the switching center includes further instructions to transmit a request to a plurality of adjacent serving sites of the plurality of serving sites, in a corresponding plurality of geographic areas, to determine the SAT signal strength of the first mobile unit as received by a corresponding transceiver within each of the plurality of adjacent serving sites; to select an adjacent serving site of the plurality of adjacent serving sites as a target serving site, and when selected, to transmit a hand-off directive to the target serving site; the switching center including further instructions to determine a second broadcast channel providing an information broadcast feature in a second geographic area served by the target serving site, and to direct the first serving center to transmit a directive to the first mobile unit to a frequency of the second broadcast channel.

Numerous other advantages and features of the present invention will become readily apparent from the following detailed description of the invention and the embodiments thereof, from the claims and from the accompanying drawings.

DETAILED DESCRIPTION OF THE INVENTION

While the present invention is susceptible of embodiment in many different forms, there are shown in the drawings and will be described herein in detail specific embodiments thereof, with the understanding that the present disclosure is to be considered as an exemplification of the principles of the invention and is not intended to limit the invention to the specific embodiments illustrated.

As mentioned above, a need remains for an apparatus, method and system that may provide or broadcast information that is specific to a given geographic region. The apparatus, method and system in accordance with the present invention provide for the broadcast of such information within such a limited geographic region and in which the information is also specific to that geographic region. In accordance with the present invention, such information may include geographically specific information such as traffic reports, sightseeing interests, weather conditions, tourist information (such as locations of hotels, restaurants, subway and bus stops, restrooms, police stations), local commercials, or any other information specific to the local geographic region. The apparatus, method and system of the present invention also provide for different or varying information to be broadcast from region to region. In addition, the apparatus, method and system of the present invention are user friendly, user transparent, cost effective, and capable of implementation in existing communication systems.

As discussed in greater detail below, in accordance with the present invention, such geographically specific information is broadcast over specific channels within a specific geographic region, such as within the broadcast region of a specific cellular transceiver. Such information will, in general, vary from region to region, will vary over time, and may be updated or modified readily and quickly. When accessed, such information is broadcast to mobile units, such as cellular telephones, which are within the given region at any given time. In accordance with the preferred embodiment, such access and broadcast are user initiated, by the user dialing a specific sequence or number designated by the service provider for this particular type of service.

In addition, specific hand-off procedures are also provided, as a mobile unit may traverse multiple geographic regions and receive different and varied information during any particular broadcast session. Also as discussed in greater detail below, the various embodiments of the present invention differ considerably from known cellular systems, among other things, with regard to hand-off procedures as mentioned above, with regard to allowing multiple mobile units to utilize the same broadcast channel, and with regard to muting the reverse channels of such mobile units during such broadcast sessions.

Figure 1:
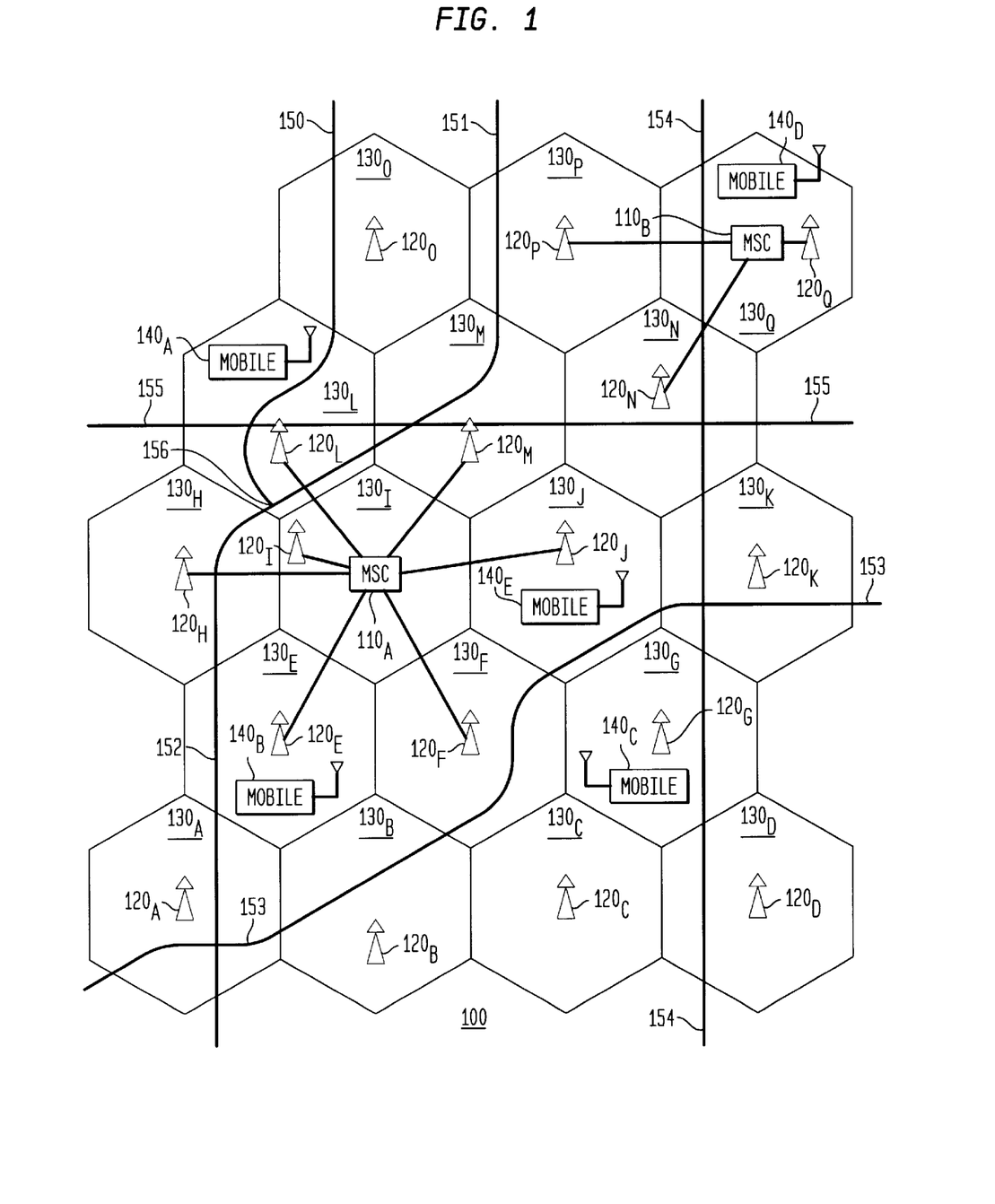
FIG. 1 is a block diagram illustrating a system embodiment in accordance with the present invention.

FIG. 1 is a block diagram illustrating a system 100 embodiment in accordance with the present invention. As illustrated in FIG. 1, the system 100 includes one or more switches 110, such as mobile switching center (MSC) 110$_A$ and 110$_B$ which are coupled or connected to various transceivers 120, such as mobile transceivers 120$_A$ through 120$_Q$. The various transceivers 120, which may be cellular frequency transceivers, provide wireless communication with various mobile units 140 which are then currently located within the corresponding geographic range, region or sector of each transceiver 120. For example, transceiver 120$_L$ may provide wireless communication with mobile unit 140$_A$, which is within its geographic broadcast region 130$_L$, while transceiver 120$_J$ may provide wireless communication with mobile unit 140$_E$, which is within its geographic broadcast region 130$_J$. Similarly, transceiver 120$_E$ may provide wireless communication to mobile unit 140$_B$, within its geographic broadcast region 130$_E$, while transceiver 120$_G$ may provide wireless communication to mobile unit 140$_C$ within its geographic broadcast region 130$_G$.

In accordance with the present invention, the system 100 provides specific information to each mobile unit 140, which is pertinent to a specific geographic region 130, through a corresponding transceiver 120. For example, utilizing MSC 110$_A$, transceiver 120$_L$ may broadcast information within its geographic broadcast region 130$_L$ pertaining to that particular geographic region. In the event mobile unit 140$_A$ accesses or subscribes to that information broadcast, mobile unit 140$_A$ will receive information pertinent to the specific geographic region 130$_L$, such as traffic information pertaining to intersection 156 and the portions of highway 150, highway 151, highway 152 and highway 155, which are within its geographic region 130$_L$. Also utilizing MSC 110$_A$, via transceiver 120$_J$, mobile unit 140$_E$ may receive traffic information pertinent to the portion of highway 153 which is within the geographic region 130$_J$. Utilizing MSC 110$_B$, via transceiver 120$_Q$, mobile unit 140$_D$ may receive information pertinent to its geographic region 130$_Q$, such as information pertaining to the portions of highway 154 which are within the geographic region 130$_Q$.

Figure 2:
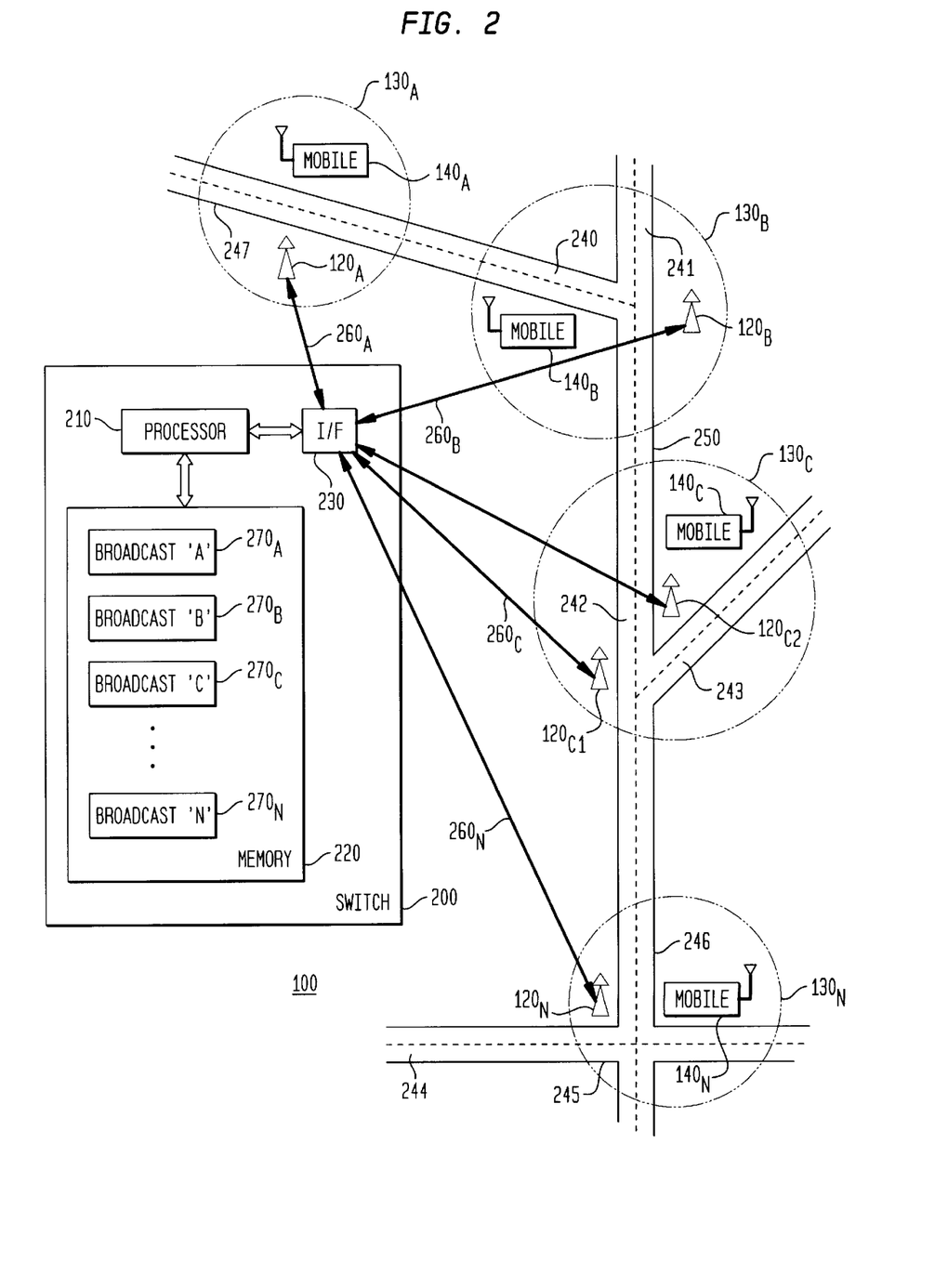
FIG. 2 is a block diagram illustrating, in greater detail, an apparatus and system in accordance with the present invention.

FIG. 2 is a block diagram illustrating, in greater detail, a system 100 and apparatus 200 in accordance with the present invention. As in FIG. 1, the system 100 includes one or more switches 110, illustrated as apparatus 200, and one or more transceivers 120 (coupled to such switches 110 via trunk lines 260). The apparatus 200, such as a switch or MSC 110, includes a processor 210, a memory 220, and a network (or system) interface 230. Through the network interface 230, the apparatus 200 (or MSC 110) is couplable or connected to various transceivers 120, such as transceivers 120$_A$ through 120$_N$, via communication lines such as trunks 260$_A$ through 260$_N$. In lieu of being embodied within a switch 110, the apparatus 200 may also be a stand-alone device, or may be incorporated elsewhere within the system 200, such as within or couplable to one or more transceivers 120, or may be distributed between or among a switch 110 and a transceiver 120.

Continuing to refer to FIG. 2, the processor 210 may include a single integrated circuit ("IC"), or may include a plurality of integrated circuits or other components, connected, arranged or grouped together, such as microprocessors, digital signal processors ("DSPs"), application specific integrated circuits ("ASICs"), associated memory (such as RAM and ROM), and other ICs and components. As a consequence, as used herein, the term processor should be understood to equivalently mean and include a single processor, or an arrangement of processors, microprocessors, controllers or some other grouping of integrated circuits which perform the functions discussed above and also discussed in detail below with reference to FIGS. 3, 4 and 5, with associated memory, such as microprocessor memory or additional RAM, ROM, EPROM or E²PROM. The methodology of the invention, as discussed above with reference to FIG. 1, and as discussed below with reference to FIGS. 3, 4 and 5, may be programmed and stored, in the processor 210 with its associated memory (or also memory 220) and other equivalent components, as a set of program instructions for subsequent execution when the processor 210 is operative (i.e., powered on and functioning).

For information broadcasts that are individually specific to each of the various regions 130, such as regions $130_A$ through $130_N$, the memory 220 stores information for broadcasts specific to each such geographic region 130, illustrated as broadcast channels 270, namely, $BROADCAST_A$ $270_A$, $BROADCAST_B$ $270_B$, $BROADCAST_C$ $270_B$ through $BROADCAST_N$ $270_N$ in memory 220. Depending upon local conditions specific to each such geographic region 130 or sector within each geographic region 130, each such broadcast channel 270 is potentially and likely to be varied and different from each of the other broadcast channels 270. In addition, a geographic region 130 may have multiple transceivers 120, with each transceiver 120 broadcasting within a sector of the geographic region, such as transceivers $120_{C1}$ and $120_{C2}$ within region $130_C$; in such case, each such transceiver 120 may be broadcasting different or varied information within its particular sector of the geographic region 130. In other circumstances, various geographic regions 130 may share the same broadcast channel, with the same information broadcast by multiple transceivers 120. Also in accordance with the present invention, each of these information broadcast channels 270 is or may be regularly updated and changed, to provide current information of potentially changing conditions, such as traffic and weather. In other embodiments, such information may be less variable, such as information pertaining to sightseeing opportunities, local events, along with the other types of information discussed above, such as tourist information.

In accordance with the present invention, for example, when broadcast information in memory 220 is traffic information, each of the various geographic regions 130 may receive different or varied information compared to the other remaining geographic regions 130. For example, via transceiver $120_A$ and trunk $260_A$, mobile unit $140_A$ in geographic region $130_A$ may receive traffic information on the broadcast channel $BROADCAST_A$, such as traffic information pertaining to the portion of a roadway 247 (within region $130_A$). In contrast, over trunk line $260_B$ and via transceiver $120_B$ in region $130_B$, mobile unit $140_B$ may receive information on broadcast channel $BROADCAST_B$, consisting of traffic information pertaining to portions of a roadway 240 and 241 (within region $130_B$). Similarly, mobile unit $140_C$ may receive traffic information pertaining to portions of roadway 242 and 243 within region $130_C$, via broadcast channel $BROADCAST_C$ transmitted via trunk line $260_C$ through transceiver $120_C$. Lastly, mobile unit $140_N$ may receive broadcast information pertaining to traffic conditions on roadways 245 and 246, via transceiver $120_N$ and trunk line $260_N$, as broadcast channel $BROADCAST_N$ may be broadcast within geographic region $130_N$.

As mentioned above, in accordance with the present invention, such access and broadcast are user initiated, by the user dialing a specific sequence or number designated by the service provider for this particular type of service, entering a feature code, pressing a particular button, or otherwise providing a notification to the service provider. In addition, specific hand-off procedures are also provided, as a mobile unit may traverse multiple geographic regions and receive different and varied information during any particular broadcast session. As a consequence, for ease of explanation, the methodology of the present invention is divided into three portions, namely, an access and broadcast portion (FIG. 3), a handoff portion (FIG. 4), and a system activation and de-activation portion (FIG. 5).

Figure 3:
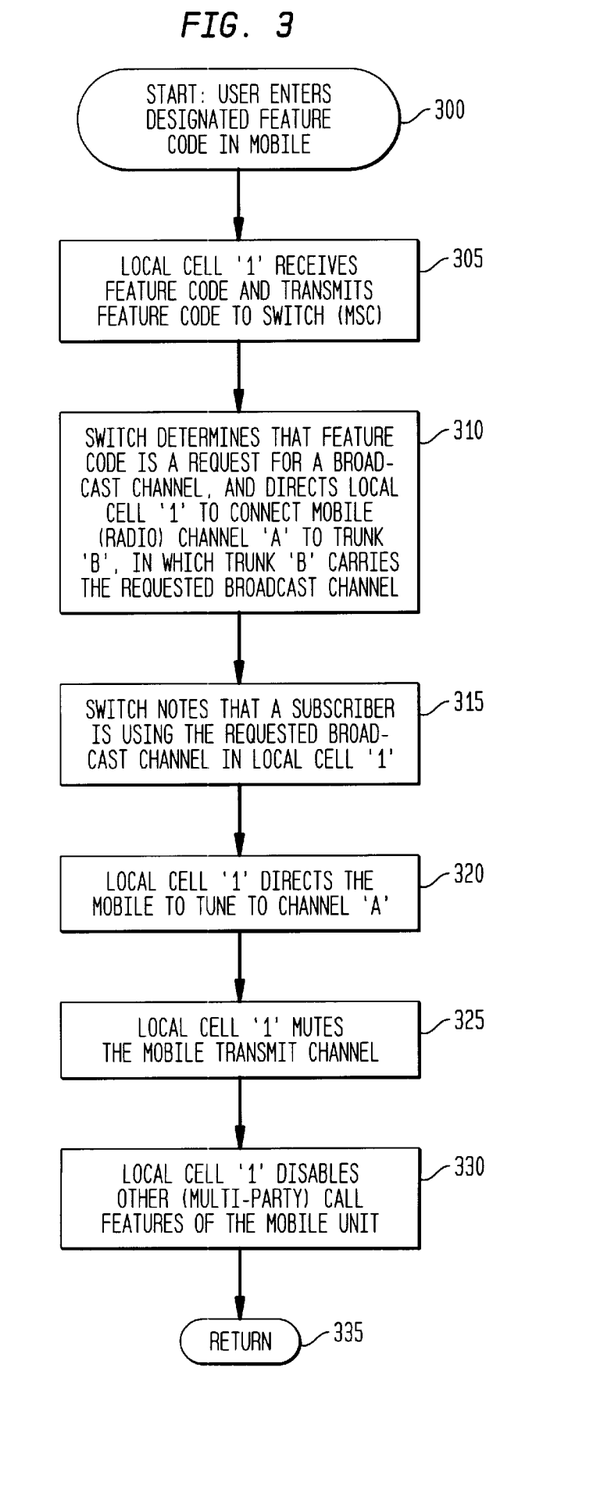
FIG. 3 is a flow diagram illustrating an access and broadcast portion of a method in accordance with the present invention.

FIG. 3 is a flow diagram illustrating a user initiation (or access) and broadcast portion of the method of the present invention. Beginning with start step 300, to access the broadcast information, a user enters a designated feature code (other designated sequence, designated directory number, or particular button) into a mobile unit 140. For example, a user may enter a feature code "*xyz" into their mobile unit 140 to access traffic information, and may enter a predesignated directory number such as "123-abc-defg" into their mobile unit 140 to access sightseeing information. Next, in step 305, the local cell site servicing the particular mobile unit, such as local cell site 1, receives the feature code from the mobile unit 140 and transmits the feature code to the appropriate switch (MSC 110). In step 310, the switch then determines that the feature code is a request for information over a broadcast channel, and directs the local cell site 1 to connect a mobile (radio) channel A (such as a cellular frequency of an analog system, a time slot of a TDMA system, or a code of a CDMA system) of a transceiver 120 to trunk B, in which the trunk B carries the requested broadcast channel. For example, for an analog system, the mobile (radio or cellular) channel utilized by the local cell site 1 as a broadcast channel is typically at a particular or selected frequency at any given time, to which the mobile unit 140 will be directed to tune, and may be carried by one or more transceivers 120 within the particular cell site, with similar directives for other systems such as TDMA or CDMA. To carry the requested information, that designated mobile broadcast channel (frequency, time slot or code assignment) is connected to the appropriate trunk 260, in this case trunk B, to provide the requested information. In addition, depending upon usage and other matters, the particular channel assignment may be variable, or may be activated or deactivated, at any given time, as discussed below.

Next, in step 315, the switch notes or keeps track that a subscriber is using the requested broadcast channel in the local cell site 1, for possible continued activation or deactivation (discussed below with reference to FIG. 5), such as by incrementing a counter or a peg count. The local cell site 1 then directs the particular mobile unit 140 to tune to the broadcast channel A, at a particular frequency, time slot or code assignment, step 320. In addition, because multiple users may be utilizing the same broadcast channel to receive the same information, the local cell site 1 also mutes the transmit (or reverse) voice channel of the particular mobile unit 140, step 325, such that the particular mobile user does not interfere with the broadcast channel through an erroneous transmission (but does not mute the transmit (or reverse) message channel). Next, in step 330, the local cell site 1 also disables other call features of the mobile unit 140 that may interfere with the proper reception of the broadcast channel, such as call waiting and other multi-party features. Following step 330, this portion of the method may end, return step 335.

As mentioned above, in accordance with the present invention, it is presumed that different geographic regions 130 serviced by a particular switch (or by other switches) will carry different information on each or many of its various broadcast channels, depending upon the geographic broadcast regions served and other locally varying conditions. As a consequence, when a mobile unit 140 continues to travel and potentially changes geographic regions 130 or changes sectors within a given geographic region 130, such as traveling from region $130_B$ to regions $130_C$ through $130_N$ in FIG. 2, in accordance with the preferred embodiment, that mobile unit 140 may receive different information as it traverses each geographic region 130, depending upon local conditions. To provide for such potentially different information broadcasts as each mobile unit 140 traverses different regions 130, in accordance with the preferred embodiment, specialized hand-off procedures are utilized. These hand-off procedures of the present invention differ from the typical or known hand-off procedures utilized in bi-directional cellular or other mobile communication systems.

Figure 4:
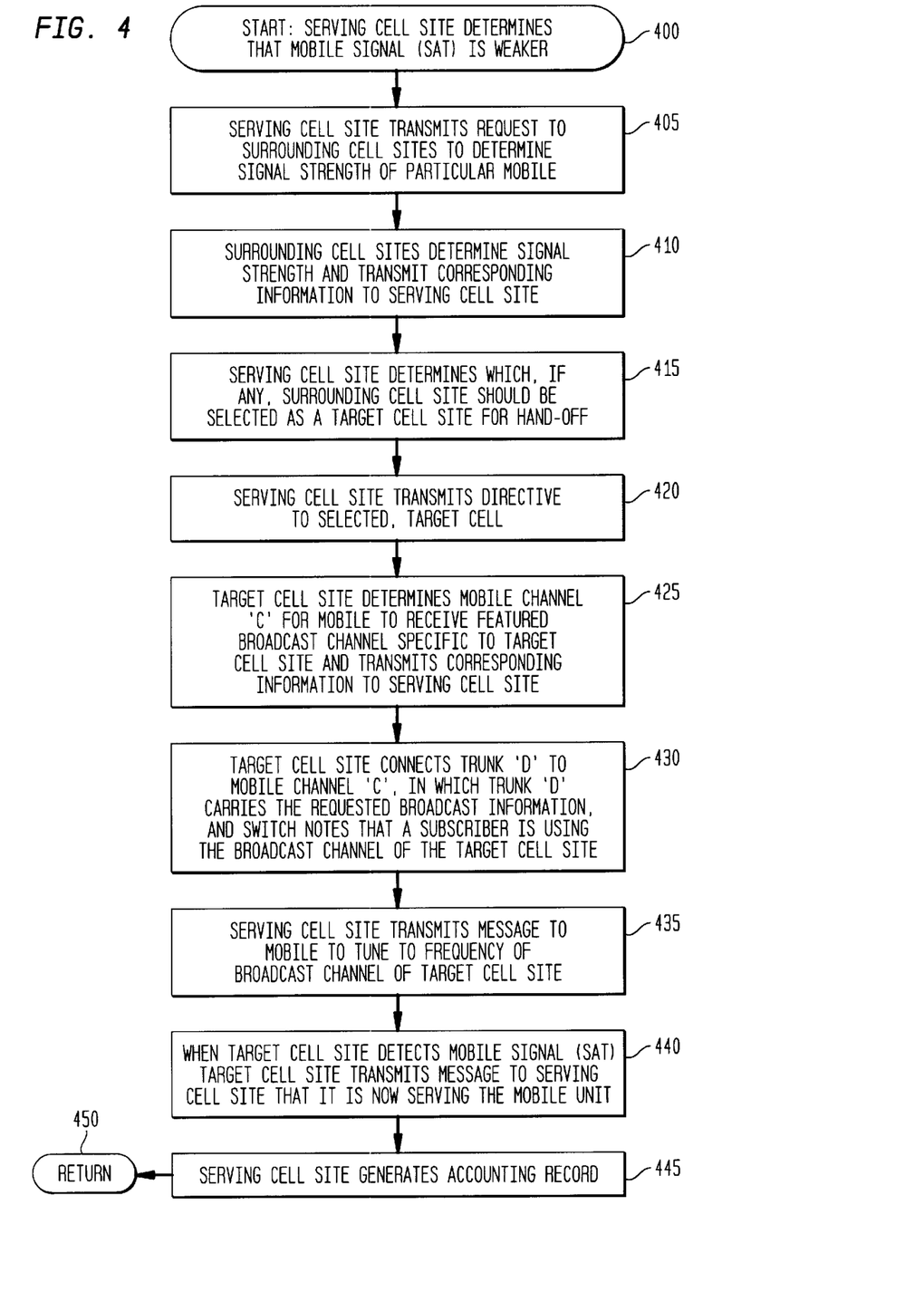
FIG. 4 is a flow diagram illustrating a handoff portion of a method in accordance with the present invention.
Figure 5:
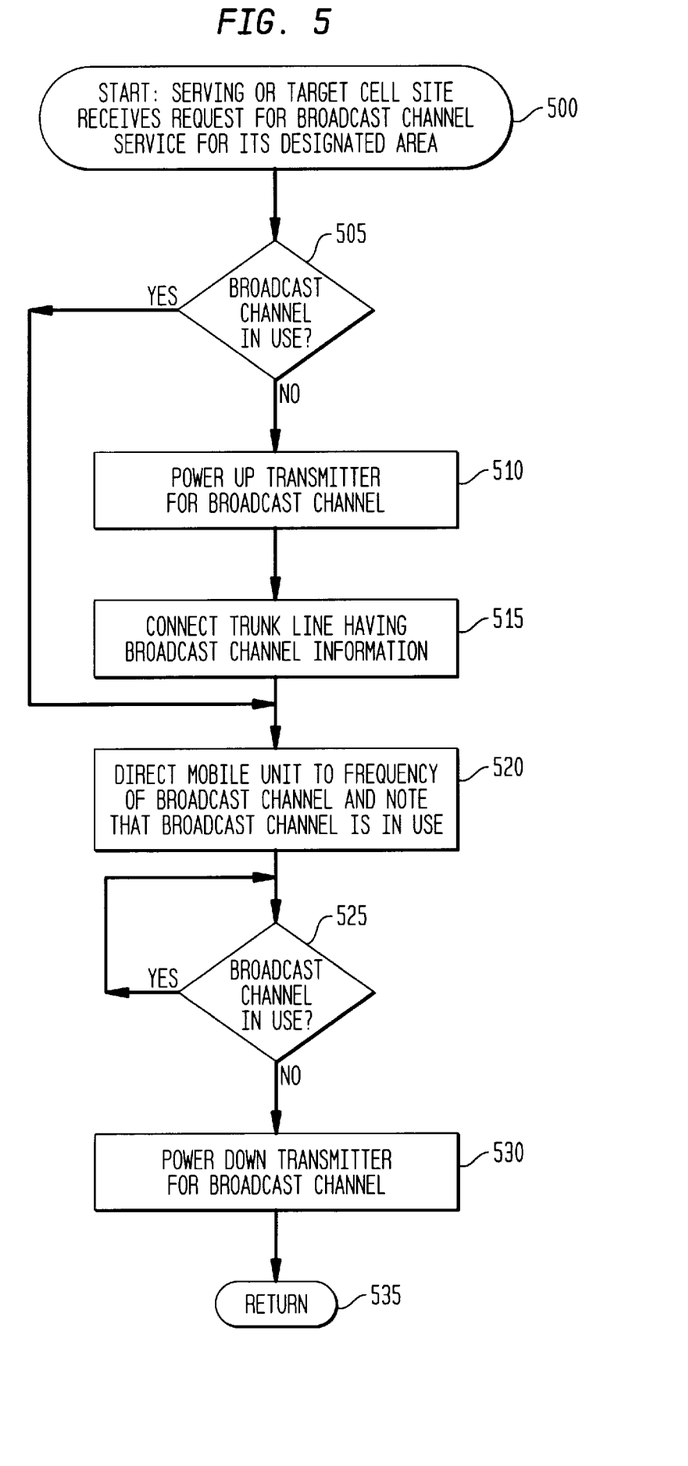
FIG. 5 is a flow diagram illustrating a system activation and de-activation portion a method in accordance with the present invention.

FIG. 4 is a flow diagram illustrating the hand-off procedures in accordance with the preferred method of the present invention. The method begins, start step 400, when the serving cell site (or transceiver) determines that the mobile signal (SAT or equivalent signal) of a mobile unit 140 (tuned to an information broadcast channel) is weaker or otherwise below a predetermined threshold value. Next, in step 405, the serving cell site transmits a request to surrounding cell sites, or to other sectors (with corresponding transceivers) within the same cell site, to determine the signal strength of that particular mobile unit 140. The surrounding cell sites (or other transceivers) determine the signal strength of the particular mobile unit 140, and transmit corresponding information about the signal strength to the serving cell site or transceiver, step 410. In other embodiments, steps 405 and 410 may be replaced by the mobile unit 410 monitoring beacon channels of the surrounding cell sites or transceivers, followed by transmitting such information (such as an ordered list of signal strengths) to the serving cell site. Next, the serving cell site or transceiver determines which, if any, surrounding cell sites or transceivers should be selected as a target cell site for a hand-off, as the mobile unit 140 may be moving into the broadcast area of the target cell site or transceiver, step 415.

With regard to step 415, it should be noted that a potential target cell site or target transceiver may not necessarily support this broadcast feature. In such a case, in the preferred embodiment, such a cell site or transceiver will not be selected as a target for a hand-off, with the serving site or serving transceiver retaining the broadcast to the particular mobile unit 140 until the signal degrades sufficiently and is dropped. Alternatively, when another potential target does support the broadcast feature, the serving cell site or transceiver may target such a cell site or transceiver for hand-off of the mobile unit 140, even though the targeted site or transceiver would otherwise be sub-optimal for a typical hand-off.

Continuing to refer to FIG. 4, when (and if) the serving cell site or transceiver has selected a target cell site or transceiver for a hand-off, the serving cell site or transceiver transmits a directive to the selected, target cell site or transceiver, informing the target of the impending hand-off, step 420. The target (cell site or transceiver) then determines what mobile channel (frequency, time slot or code assignment), such as mobile channel C, to which the mobile unit 140 should re-tune to receive the featured broadcast channel having information specific to the geographic region of the target cell site or sector of the transceiver, such as traffic information, and transmits the corresponding information to the serving cell site, step 425. The target cell site or transceiver, or more particularly, the switch controlling the target cell site or transceiver, connects the appropriate trunk carrying the requested broadcast information, such as trunk D, to the corresponding mobile broadcast channel, such as mobile channel C, and the switch notes that a subscriber is using the broadcast channel of the target cell site, step 430, such as by incrementing a counter. The serving cell site transmits a message to the mobile unit 140 to tune to the broadcast channel of the target cell site, step 435. Next, when the target cell site detects the mobile signal (SAT or equivalent) of the mobile unit 140, the target transmits a message to the serving cell site or transceiver that it (the target) is now serving the mobile unit, step 440. In the preferred embodiment, the formerly serving cell site or transceiver generates an accounting record, for subsequent use in billing or other subscriber accounting step 445, and the hand-off portion of the method may end, return step 450.

There are significant differences between this hand-off portion of the method of the present invention and known hand-off procedures. For example, for a typical bi-directional communication (such as for a mobile telephone conversation), a network trunk connection is maintained between the mobile channel and the other party to the call (which may be PSTN or another mobile); during a hand-off to a target cell site, another trunk connection is established and maintained between the serving and target cell sites to transfer the call and keep the call connected to the mobile unit in the new location. In contrast, because the information broadcast channel is a unidirectional communication (one-way broadcast) in accordance with the present invention, no such new trunk connection needs to be established or maintained between the serving and target cell sites.

In addition, in a typical bi-directional communication session of the prior art, the first serving cell site continues to be the control point for the communication session, and maintain the PSTN or other network connection for the duration of the session, regardless of the various hand-offs which may occur from cell to cell. In contrast, in accordance with the present invention, the control point changes from the serving cell or transceiver to the target cell or transceiver (and subsequent targets) as the mobile unit travels. As a consequence, if desired, when the hand-off has been completed (step 440, FIG. 4), the serving cell site is free to perform other activities, such as generating billing records or automatic message accounting ("AMA").

FIG. 5 is a flow diagram illustrating system activation and deactivation in accordance with the present invention. As mentioned above, in the preferred embodiment, the system of the present invention is user activated, with information broadcast occurring based upon a customer request, such as through entry of a feature code (FIG. 3, step 300). As a consequence, in accordance with the preferred embodiment, user activity is monitored to correspondingly activate or deactivate the information broadcast channel for any given broadcast region. Alternatively, various service providers may elect to maintain a broadcast channel in an active state at all times, regardless of mobile usage; accordingly, the service provider may elect to omit or otherwise not implement the procedures illustrated in FIG. 5.

Referring to FIG. 5, beginning with start step 500, the system is activated when the serving or the target cell site receives such a request for broadcast channel service for its designated area, as in step 300 discussed above. Upon receipt of such a request, the method then determines whether the broadcast channel is currently in use, step 505, such as the information channel is already being broadcast because of a request from another mobile user. As mentioned above, in the preferred embodiment, such use is tracked by utilizing a counter, such that the channel is determined to be in current use whenever the count is not equal to zero. When the broadcast channel is not in current use in step 505, the method proceeds to step 510 and powers up the transmitter (of the transceiver 120) for the broadcast channel, and connects the appropriate trunk line having the broadcast channel information, step 515. Following step 515, or when the broadcast channel is already in use in step 505 (such that a corresponding transmitter is already powered up and a trunk line is already connected) the method proceeds to step 520. In step 520, the requesting mobile unit 140 is directed to tune to the broadcast channel (frequency, time slot, or code assignment), and the switch notes that the broadcast channel is in use (such as by incrementing a counter, as in step 315 discussed above).

The method then continues to monitor whether the information broadcast channel is in use, such that the corresponding transmitter may be powered down when not in use. As a consequence, when the broadcast channel is not in use in step 525, e.g., the count equals zero, the method proceeds to power down the transmitter for the information broadcast channel, step 530, and the activation and de-activation portion of the method may end, return step 535.

Numerous advantages of the present invention may be apparent from the above discussion. The apparatus, method and system in accordance with the present invention provide or broadcast information that is specific to a given geographic region and which may vary from region to region (or vary from sector to sector within a given region), such as traffic reports, sightseeing interests, public services information, weather conditions, or any other information specific to the local geographic region. When accessed, such information is broadcast to one or more mobile units over a shared broadcast channel, such as to cellular telephones, which are within a given region at any given time. In accordance with the preferred embodiment, such access and broadcast are user initiated, by the user dialing a specific sequence or number designated by the service provider for this particular type of service. The present invention also utilizes specific hand-off procedures, as a mobile unit may traverse multiple geographic regions and receive different and varied information during any particular broadcast session. In addition, the apparatus, method and system of the present invention are user friendly, user transparent, cost effective, and capable of implementation in existing communication systems.

From the foregoing, it will be observed that numerous variations and modifications may be effected without departing from the spirit and scope of the novel concept of the invention. It is to be understood that no limitation with respect to the specific methods and apparatus illustrated herein is intended or should be inferred. It is, of course, intended to cover by the appended claims all such modifications as fall within the scope of the claims.

We claim:

1. A method for mobile broadcast of information specific to a geographic region, the method comprising:

(a) receiving a first request from a first mobile unit for an information broadcast feature in a first geographic area served by a first serving transceiver;

(b) determining whether a broadcast channel providing the information broadcast feature is currently in use in the first geographic area;

(c) when the broadcast channel is not currently in use in the first geographic area, providing power to a transmitter for the broadcast channel of the first serving transceiver and connecting a trunk line having the requested information broadcast feature to the broadcast channel;

(d) directing the first mobile unit to the broadcast channel in the first geographic area; and (e) muting a transmit voice channel of the first mobile unit.

2. The method of claim 1 wherein step (a) further comprises:

receiving a designated feature code.

3. The method of claim 1 wherein step (e) further comprises:

disabling any multi-party features of the first mobile unit.

4. The method of claim 1, further comprising:

monitoring whether any mobile unit of a plurality of mobile units is receiving the broadcast channel in the first geographic area.

5. The method of claim 4, further comprising:

when there are no mobile units of the plurality of mobile units receiving the broadcast channel in the first geographic area, removing power to the transmitter for the broadcast channel of the first serving transceiver.

6. The method of claim 1, further comprising:

while the first mobile unit is receiving the broadcast channel in the first geographic area, receiving a second request from a second mobile unit for the information broadcast feature in the first geographic area;

directing the second mobile unit to the broadcast channel in the first geographic area; and muting a transmit voice channel of the second mobile unit.

7. The method of claim 1, further comprising:

monitoring a signal strength of the first mobile unit.

8. The method of claim 7, further comprising:

when the signal strength of the first mobile unit received by the first serving transceiver is below a predetermined level, transmitting a request to a plurality of adjacent serving transceivers in a corresponding plurality of geographic areas to determine the signal strength of the first mobile unit;

selecting an adjacent serving transceiver of the plurality of adjacent serving transceivers as a target serving transceiver;

transmitting a hand-off directive to the target serving transceiver;

determining a second broadcast channel providing an information broadcast feature in a second geographic area served by the target serving transceiver; and directing the first mobile unit to the second broadcast channel.

9. The method of claim 8, further comprising:

transmitting a message to the first serving transceiver that the target serving transceiver is serving the first mobile unit.

10. The method of claim 8, further comprising:

generating an accounting record for the first serving transceiver.

11. A system for mobile broadcast of information specific to a geographic region, the system comprising:

a plurality of serving transceivers located in a corresponding plurality of geographic areas, the plurality of serving transceivers having a first serving transceiver; and a switching center coupled via a plurality of trunk lines to the plurality of serving transceivers, wherein the switching center, when operative, includes program instructions to receive from the first serving transceiver a first request from a first mobile unit for an information broadcast feature in a first geographic area served by the first serving transceiver, and to determine whether a broadcast channel providing the information broadcast feature is currently in use in the first geographic area; the switching center including further instructions, when the broadcast channel is not currently in use in the first geographic area, to connect a trunk line having the requested information broadcast feature to the broadcast channel and to direct the first serving transceiver to provide power to a transmitter for the broadcast channel; the switching center including further instructions to direct the first serving transceiver to transmit a directive to the first mobile unit to the broadcast channel in the first geographic area, and to mute a transmit voice channel of the first mobile unit.

12. The system of claim 11 wherein the first request comprises a designated feature code received by the first serving transceiver.

13. The system of claim 11 wherein the switching center includes further instructions to direct the first serving transceiver to disable any multiparty features of the first mobile unit.

14. The system of claim 11 wherein the switching center includes further instructions to monitor whether any mobile unit of a plurality of mobile units is receiving the broadcast channel in the first geographic area.

15. The system of claim 14 wherein the switching center includes further instructions, when there are no mobile units of the plurality of mobile units receiving the broadcast channel in the first geographic area, to direct the first serving transceiver to remove power to the transmitter of the broadcast channel.

16. The system of claim 11 wherein the switching center includes further instructions, while the first mobile unit is receiving the broadcast channel in the first geographic area, to receive from the first serving transceiver a second request from a second mobile unit for the information broadcast feature in the first geographic area; the switching center including further instructions to direct the first serving transceiver to transmit a directive to the second mobile unit to the broadcast channel in the first geographic area and to mute a transmit voice channel of the second mobile unit.

17. The system of claim 11 wherein the switching center includes further instructions to monitor a signal strength of the first mobile unit.

18. The system of claim 17 wherein the switching center includes further instructions, when the signal strength of the first mobile unit received by the first serving transceiver is below a predetermined level, to transmit a request to a plurality of adjacent serving transceivers, in a corresponding plurality of geographic areas, to determine the signal strength of the first mobile unit; the switching center including further instructions to select an adjacent serving transceiver of the plurality of adjacent serving transceivers as a target serving transceiver, and to transmit a hand-off directive to the target serving transceiver; the switching center including further instructions to determine a second broadcast channel providing an information broadcast feature in a second geographic area served by the target serving transceiver, and to direct the first serving transceiver to transmit a directive to the first mobile unit to the second broadcast channel.

19. The system of claim 18 wherein the switching center includes further instructions to transmit a message to the first serving transceiver that the target serving transceiver is serving the first mobile unit.

20. The system of claim 18, wherein the switching center includes further instructions to generate an accounting record for the first serving transceiver.

21. The system of claim 11, wherein the switching center is further comprised of:

a network interface couplable to the plurality of trunk lines;

a memory, the memory storing a plurality of information broadcast features; and a processor coupled to the network interface and to the memory.

22. An apparatus for mobile broadcast of information specific to a geographic region, the apparatus couplable via a plurality of trunk lines to a plurality of serving transceivers located in a corresponding plurality of geographic areas, the plurality of serving transceivers having a first serving transceiver, the apparatus comprising:

a network interface couplable to the plurality of trunk lines;

a memory, the memory storing a plurality of information broadcast features; and a processor coupled to the network interface and to the memory, wherein the processor, when operative, includes program instructions to receive from the first serving transceiver a first request from a first mobile unit for an information broadcast feature in a first geographic area served by the first serving transceiver, and to determine whether a broadcast channel providing the information broadcast feature is currently in use in the first geographic area; the processor including further instructions, when the broadcast channel is not currently in use in the first geographic area, to connect a trunk line, of the plurality of trunk lines, having the requested information broadcast feature to the broadcast channel and to direct the first serving transceiver to provide power to a transmitter for the broadcast channel; the processor including further instructions to direct the first serving transceiver to transmit a directive to the first mobile unit to the broadcast channel in the first geographic area, and to mute a transmit voice channel of the first mobile unit.

23. The apparatus of claim 22 wherein the first request comprises a designated feature code received by the first serving transceiver.

24. The apparatus of claim 22 wherein the processor includes further instructions to direct the first serving transceiver to disable any multiparty features of the first mobile unit.

25. The apparatus of claim 22 wherein the processor includes further instructions to monitor whether any mobile unit of a plurality of mobile units is receiving the broadcast channel in the first geographic area.

26. The apparatus of claim 25 wherein the processor includes further instructions, when there is no mobile unit of the plurality of mobile units which is receiving the broadcast channel in the first geographic area, to direct the first serving transceiver to remove power to the transmitter of the broadcast channel.

27. The apparatus of claim 22 wherein the processor includes further instructions, while the first mobile unit is receiving the broadcast channel in the first geographic area, to receive from the first serving transceiver a second request from a second mobile unit for the information broadcast feature in the first geographic area; the processor including further instructions to direct the first serving transceiver to transmit a directive to the second mobile unit to the broadcast channel in the first geographic area and to mute a transmit voice channel of the second mobile unit.

28. The apparatus of claim 22 wherein the processor includes further instructions to monitor a signal strength of the first mobile unit.

29. The apparatus of claim 28 wherein the processor includes further instructions, when the signal strength of the first mobile unit received by the first serving transceiver is below a predetermined level, to transmit a request to a plurality of adjacent serving transceivers in a corresponding plurality of geographic areas to determine the signal strength of the first mobile unit; the processor including further instructions to select an adjacent serving transceiver of the plurality of adjacent serving transceivers as a target serving transceiver, and to transmit a hand-off directive to the target serving transceiver; the processor including further instructions to determine a second broadcast channel providing an information broadcast feature in a second geographic area served by the target serving transceiver, and to direct the first serving transceiver to transmit a directive to the first mobile unit to the second broadcast channel.

30. The apparatus of claim 29 wherein the processor includes further instructions to transmit a message to the first serving transceiver that the target serving transceiver is serving the first mobile unit.

31. The apparatus of claim 29, wherein the processor includes further instructions to generate an accounting record for the first serving transceiver.

* * * * *